United States Patent
Brennan

(10) Patent No.: US 11,004,251 B2
(45) Date of Patent: May 11, 2021

(54) AUTOMATIC CONFIGURATION OF KNOBS TO OPTIMIZE PERFORMANCE OF A GRAPHICS PIPELINE

(71) Applicant: ADVANCED MICRO DEVICES, INC., Santa Clara, CA (US)

(72) Inventor: Christopher J. Brennan, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/201,879

(22) Filed: Nov. 27, 2018

(65) Prior Publication Data
US 2020/0167985 A1    May 28, 2020

(51) Int. Cl.
*G06T 15/00*    (2011.01)
*G06T 1/20*    (2006.01)
*G06T 1/60*    (2006.01)

(52) U.S. Cl.
CPC .............. *G06T 15/005* (2013.01); *G06T 1/20* (2013.01); *G06T 1/60* (2013.01); *G06T 2200/28* (2013.01); *G06T 2210/52* (2013.01)

(58) Field of Classification Search
CPC ........... G06T 15/005; G06T 1/60; G06T 1/20; G06T 2200/28; G06T 2210/52
See application file for complete search history.

(56) References Cited

U.S. PATENT DOCUMENTS

| | | | | |
|---|---|---|---|---|
| 8,085,273 B2 * | 12/2011 | Bakalash | .............. | G06F 9/5066 345/501 |
| 8,098,255 B2 | 1/2012 | Fouladi et al. | | |
| 2008/0001956 A1 * | 1/2008 | Markovic | ............. | G06T 15/005 345/522 |
| 2009/0109230 A1 * | 4/2009 | Miller | ................... | G06F 1/3203 345/506 |
| 2011/0022857 A1 * | 1/2011 | Nussbaum | ............ | G06F 1/3203 713/300 |
| 2013/0038620 A1 * | 2/2013 | Hakura | ..................... | G06T 1/20 345/582 |

(Continued)

OTHER PUBLICATIONS

Ashida, Koji, "Optimising the Graphics Pipeline", NVIDIA, 2004, 45 pages.

(Continued)

*Primary Examiner* — Samantha (Yuehan) Wang

(57) ABSTRACT

A knob has a plurality of settings that configure a graphics pipeline. A first setting is associated with a first state of the graphics pipeline. The first setting is associated with the first state based on a measure of performance of the graphics pipeline while configured according to the first setting. The graphics pipeline is configured according to the first setting in response to the first state of the graphics pipeline matching a current state of the graphics pipeline. The graphics pipeline processes graphics according to the first setting. In some cases, the first setting is associated with the first state of the graphics pipeline by dithering or toggling the knob between the settings once per frame for a predetermined number of frames. The first setting achieves better performance than other ones of the plurality of settings during the predetermined number of frames.

18 Claims, 7 Drawing Sheets

(56) References Cited

U.S. PATENT DOCUMENTS

2016/0055612 A1* 2/2016 Barik ................. G06T 1/20
 345/522
2017/0323419 A1* 11/2017 Holland ............... G06T 1/60

OTHER PUBLICATIONS

Website https://docs.microsoft.com/en-us/windows/desktop/direct3d12/managing-graphics-pipeline-state-in-direct3d-12?WT.mc_id=email, "Managing Graphics Pipeline State in Direct3D 12", May 30, 2018, 5 pages.

* cited by examiner

AUTOMATIC CONFIGURATION OF KNOBS TO OPTIMIZE PERFORMANCE OF A GRAPHICS PIPELINE

BACKGROUND

Graphics processing units (GPUs) include numerous compute units for executing instructions concurrently or in parallel. In some cases, a GPU implements a graphics pipeline to render two-dimensional (2D) images from a three-dimensional (3D) representation of a scene. A conventional graphics pipeline for processing 3D graphics is formed of a sequence of fixed-function hardware block arrangements supported by programmable shaders that execute on the compute units in the GPU. These arrangements are usually specified by a graphics application programming interface (API) processing order such as specified in specifications of Microsoft DX 11/12 or Khronos Group OpenGL/Vulkan APIs. GPU hardware provides numerous "knobs" that are configured in different settings to optimize performance of the GPU for different types of applications. A knob is implemented in hardware using registers, memory elements, switches, or other structures that represent modifiable values of the knob. For example, one knob implemented in a GPU is a register that is used to turn a primitive batch binner on or off by setting a value of a bit in the register to "1" or "0," respectively. For another example, a range of values of a knob can be represented by values of a plurality of bits of a register. The set of knobs in a GPU are typically adjusted manually based on the results of profiling applications that are considered a high priority at the time a product including the GPU is released. For example, settings for the knobs can be manually adjusted based on the results of profiling recently released, best-selling games. In some cases, configuring the knobs includes defining white lists or blacklists for some applications or states/modes inside the applications. The settings are rarely changed after the initial configuration of the knobs in the GPU, at least in part because changing the knobs can cause regressions.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
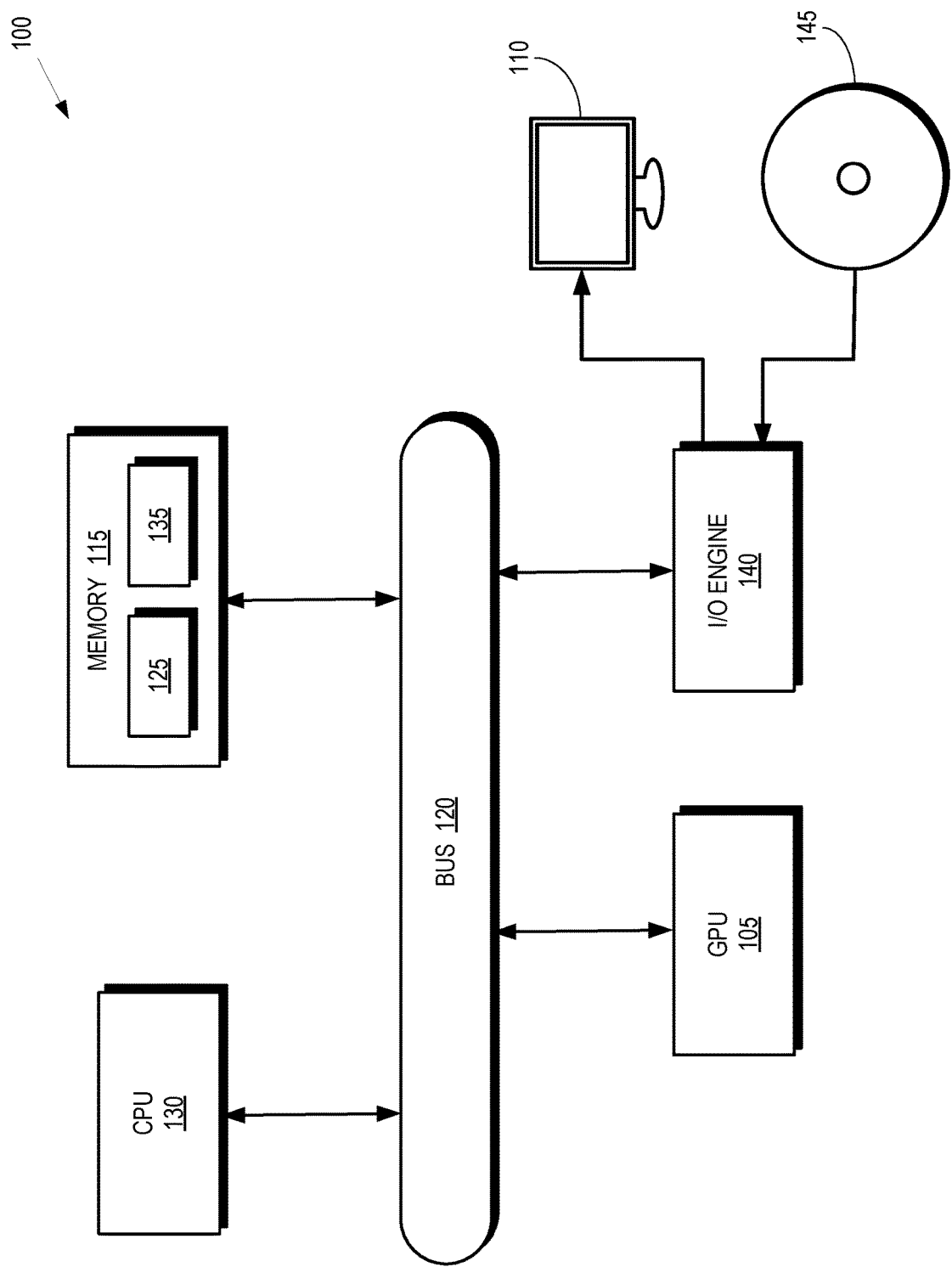
FIG. 1 is a block diagram of a processing system that includes a graphics processing unit (GPU) for creating visual images intended for output to a display according to some embodiments.

There are a number of drawbacks to manual configuration of knob settings in a graphics processing unit (GPU). First, new applications must be constantly profiled to identify the optimal knob settings and operation modes. This is a continuing engineering cost that accumulates as new applications are released. Lower priority applications are neglected because of cost and time constraints. Moreover, the profiling does not necessarily capture information for all the settings or scenes produced by an application and the knob settings do not necessarily optimize for the settings/scenes that are not profiled. Second, the knob settings for an application are only likely to be correct for the hardware configuration that was profiled. The available knob settings do not necessarily optimize GPUs that use other hardware configurations such as older or non-top-tier GPUs. Third, newly generated knob settings must be updated, distributed, and maintained, which represents an ongoing cost. Fourth, the knob settings are not optimized for applications that are in development while the profile is being performed, which makes it difficult or impossible for developers to adapt algorithms for the optimizations. Fifth, the difficulty in retuning knobs as bottlenecks in applications executing on the hardware change results in missed opportunities for performance improvements that were obscured during the initial profiling.

FIGS. 1-6 disclose techniques for dynamically determining settings of one or more knobs that enable or disable hardware optimization features of a graphics processing unit (GPU) for applications of a shader by executing the shader using different settings of the knobs in alternating time intervals within a testing time interval. For example, the setting of a knob that turns primitive batch binning on or off is dithered or toggled between an on state and an off state once per frame for a predetermined number of frames such as 6-8 frames. An end-of-pipe timestamp is written out around any work using a knob, as well as an identifier of the knob. The timestamp and knob identifier are written to a feedback buffer. The values of the end-of-pipe timestamps are compared for the different settings of the knobs at the end of the predetermined number of frames. The settings that result in a higher level of performance are then associated or correlated with the hash of the state information. The knobs are configured using the settings associated with the hash of state information associated with a shader for a subsequent application of the shader using the same as state information acquired during the testing time interval. For example, if improved performance occurs when a primitive batch binner is turned on while executing a particular pixel shader during a testing time interval, the primitive batch binner is also turned on for subsequent applications of the pixel shader, as indicated by a hash of the pixel shader. The testing time interval can be repeated periodically, in response to an event, or at other times. In some cases, multiple different settings of the knobs are identified as optimizing the hardware in different states of the GPU. The knob settings can then be dynamically updated in response to the state of the GPU matching the states associated with the different knob settings, e.g., as indicated by a match between a hash of the current state of the GPU and a hash of the state of the GPU associated with one of the knob settings.

FIG. 1 is a block diagram of a processing system 100 that includes a graphics processing unit (GPU) 105 for creating visual images intended for output to a display 110 according to some embodiments. The processing system 100 includes a memory 115. Some embodiments of the memory 115 are implemented as a dynamic random access memory (DRAM). However, the memory 115 can also be implemented using other types of memory including static random access memory (SRAM), nonvolatile RAM, and the like. In the illustrated embodiment, the GPU 105 communicates with the memory 115 over a bus 120. However, some embodiments of the GPU 105 communicate with the memory 115 over a direct connection or via other buses, bridges, switches, routers, and the like. The GPU 105 can execute instructions stored in the memory 115 and the GPU 105 can store information in the memory 115 such as the results of the executed instructions. For example, the memory 115 can store a copy 125 of instructions from a program code that is to be executed by the GPU 105. Some embodiments of the GPU 105 include multiple processor cores (not shown in the interest of clarity) that can independently execute instructions concurrently or in parallel.

The processing system 100 includes a central processing unit (CPU) 130 for executing instructions. Some embodiments of the CPU 130 include multiple processor cores (not shown in the interest of clarity) that can independently execute instructions concurrently or in parallel. The CPU 130 is also connected to the bus 120 and can therefore communicate with the GPU 105 and the memory 115 via the bus 120. The CPU 130 executes instructions such as program code 135 stored in the memory 115 and the CPU 130 stores information in the memory 115 such as the results of the executed instructions. The CPU 130 is also able to initiate graphics processing by issuing draw calls to the GPU 105. A draw call is a command that is generated by the CPU 130 and transmitted to the GPU 105 to instruct the GPU 105 render an object in a frame (or a portion of an object). Some embodiments of a draw call include information defining textures, states, shaders, rendering objects, buffers, and the like that are used by the GPU 105 to render the object or portion thereof. The information included in the draw call can be referred to as a state vector that includes state information. The GPU 105 renders the object to produce values of pixels that are provided to the display 110, which uses the pixel values to display an image that represents the rendered object.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 communicates with the GPU 105, the memory 115, or the CPU 130. In the illustrated embodiment, the I/O engine 140 is configured to read information stored on an external storage medium 145, such as a compact disk (CD), a digital video disc (DVD), and the like. The external storage medium 145 stores information representative of program code used to implement an application such as a video game. The program code on the external storage medium 145 can be written to the memory 115 to form the copy 125 of instructions that are to be executed by the GPU 105 or the CPU 130.

The GPU 105 implements a graphics pipeline (not shown in FIG. 1 in the interest of clarity) that includes multiple stages configured for concurrent processing of different primitives in response to a draw call. Stages of the graphics pipeline in the GPU 105 can concurrently process different primitives generated by an application, such as a video game. When geometry is submitted to the graphics pipeline, hardware state settings are chosen to define a state of the graphics pipeline. Examples of state include rasterizer state, a blend state, a depth stencil state, a primitive topology type of the submitted geometry, and the shaders (e.g., vertex shader, domain shader, geometry shader, hull shader, pixel shader, and the like) that are used to render the scene. The shaders that are implemented in the graphics pipeline state are represented by corresponding byte codes. In some cases, the information representing the graphics pipeline state is hashed or compressed to provide a more efficient representation of the graphics pipeline state.

The performance of the graphics pipeline is optimized by choosing the appropriate settings for the knobs. For example, GPU timestamps for draw calls can indicate that the time required to execute the corresponding instruction is shorter for a first knob setting than a second knob setting. The first knob setting therefore optimizes the performance of the graphics pipeline. In order to automate the selection of knob settings, some embodiments of the GPU 105 associate information indicating a state of the graphics pipeline with optimal settings of one or more knobs for that state. For example, an optimal knob setting can be correlated with a value of a hash of the graphics pipeline state, or a portion of the graphics pipeline state. The optimal setting associated with the state based on a measure of performance of the graphics pipeline while configured according to the optimal setting. The graphics pipeline is then configured according to the optimal setting in response to the information indicating the state of the graphics pipeline matching a current state of the graphics pipeline. For example, the values of the knobs can be stored in corresponding registers that are used to configure the graphics pipeline. Once the hardware settings of the graphics pipeline have been configured based on the optimal settings, the graphics pipeline processes graphics according to the optimal settings.

Figure 2:
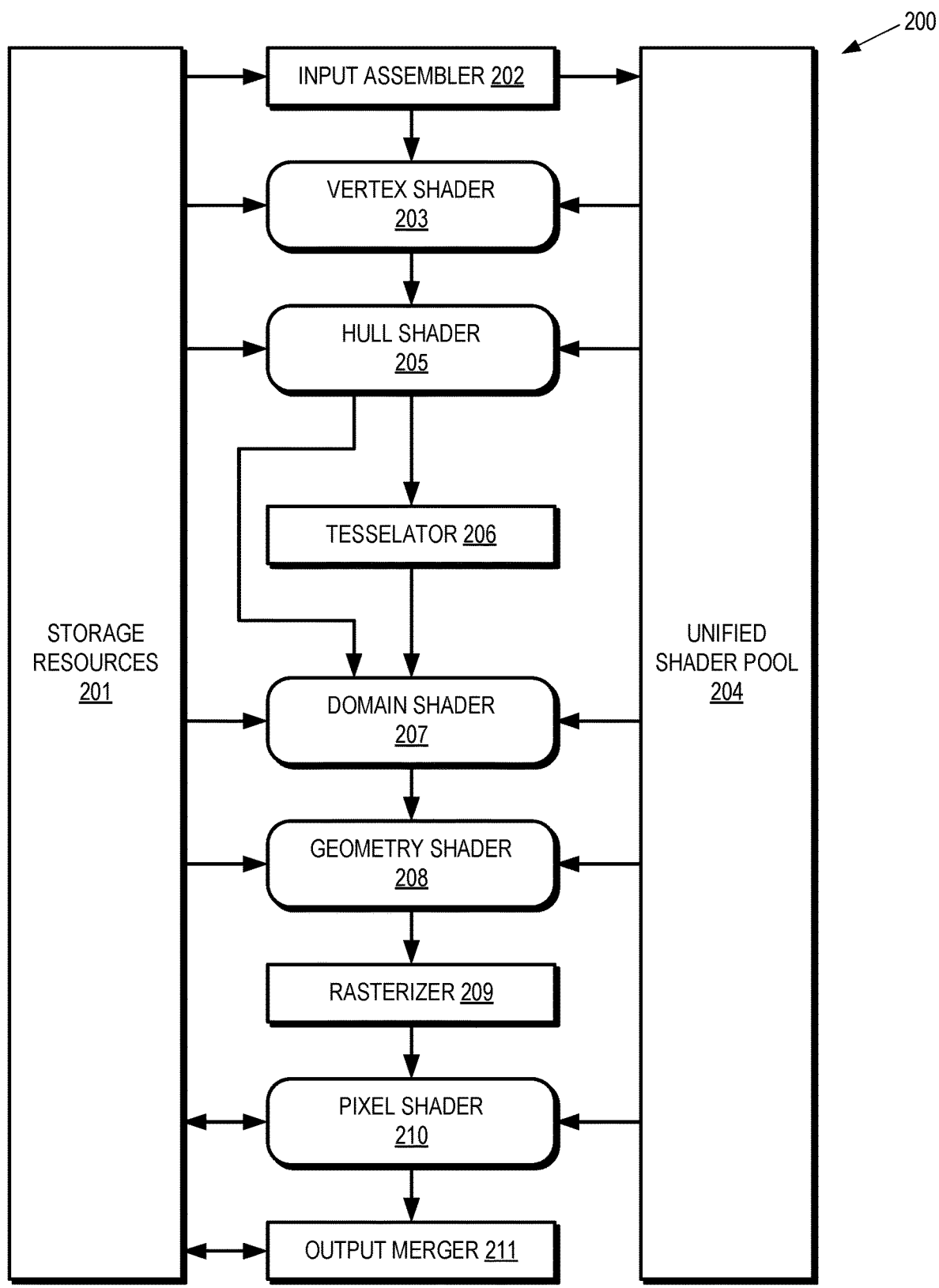
FIG. 2 depicts a graphics pipeline that is capable of processing high-order geometry primitives to generate rasterized images of three-dimensional (3-D) scenes at a predetermined resolution according to some embodiments.

FIG. 2 depicts a graphics pipeline 200 that is capable of processing high-order geometry primitives to generate rasterized images of three-dimensional (3-D) scenes at a predetermined resolution according to some embodiments. The graphics pipeline 200 is implemented in some embodiments of the GPU 105 shown in FIG. 1. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like.

The graphics pipeline 200 has access to storage resources 201 such as a hierarchy of one or more memories or caches that are used to implement buffers and store vertex data, texture data, and the like. The storage resources 201 can be implemented using some embodiments of the memory 115 shown in FIG. 1.

An input assembler 202 is configured to access information from the storage resources 201 that is used to define objects that represent portions of a model of a scene. A vertex shader 203, which can be implemented in software, logically receives a single vertex of a primitive as input and outputs a single vertex. Some embodiments of shaders such as the vertex shader 203 implement single-instruction-multiple-data (SIMD) processing so that multiple vertices are processed concurrently. The graphics pipeline 200 shown in FIG. 2 implements a unified shader model so that all the shaders included in the graphics pipeline 200 have the same execution platform on the shared SIMD compute units. The shaders, including the vertex shader 203, are therefore implemented using a common set of resources that is referred to herein as the unified shader pool 204. Some embodiments of the unified shader pool 204 are implemented using processors in the GPU 105 shown in FIG. 1.

A hull shader 205 operates on input high-order patches or control points that are used to define the input patches. The hull shader 205 outputs tessellation factors and other patch data. Primitives generated by the hull shader 205 can optionally be provided to a tessellator 206. The tessellator 206 receives objects (such as patches) from the hull shader 205 and generates information identifying primitives corresponding to the input object, e.g., by tessellating the input objects based on tessellation factors provided to the tessellator 106 by the hull shader 205. Tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details can be added by tessellating the higher-order primitive.

A domain shader 207 inputs a domain location and (optionally) other patch data. The domain shader 207 operates on the provided information and generates a single vertex for output based on the input domain location and other information. A geometry shader 208 receives an input primitive and outputs up to four primitives that are generated by the geometry shader 208 based on the input primitive. One stream of primitives is provided to a rasterizer 209 and up to four streams of primitives can be concatenated to buffers in the storage resources 201. The rasterizer 209 performs shading operations and other operations such as clipping, perspective dividing, scissoring, and viewport selection, and the like. A pixel shader 210 inputs a pixel flow and outputs zero or another pixel flow in response to the input pixel flow. An output merger block 211 performs blend, depth, stencil, or other operations on pixels received from the pixel shader 210.

As discussed herein, the state of the graphics pipeline 200 is determined by hardware settings and knobs associated with the graphics pipeline 200. For example, the graphics pipeline may or may not implement the pixel shader 210 depending on the value of the corresponding setting. The presence or absence of the pixel shader 210 in the graphics pipeline 200 is indicated by a value of a hash that indicates whether the pixel shader 210 is present in the graphics pipeline 200. For example, the pixel shader 210 is present if the state includes a hash of a byte code of the pixel shader 210.

Figure 3:
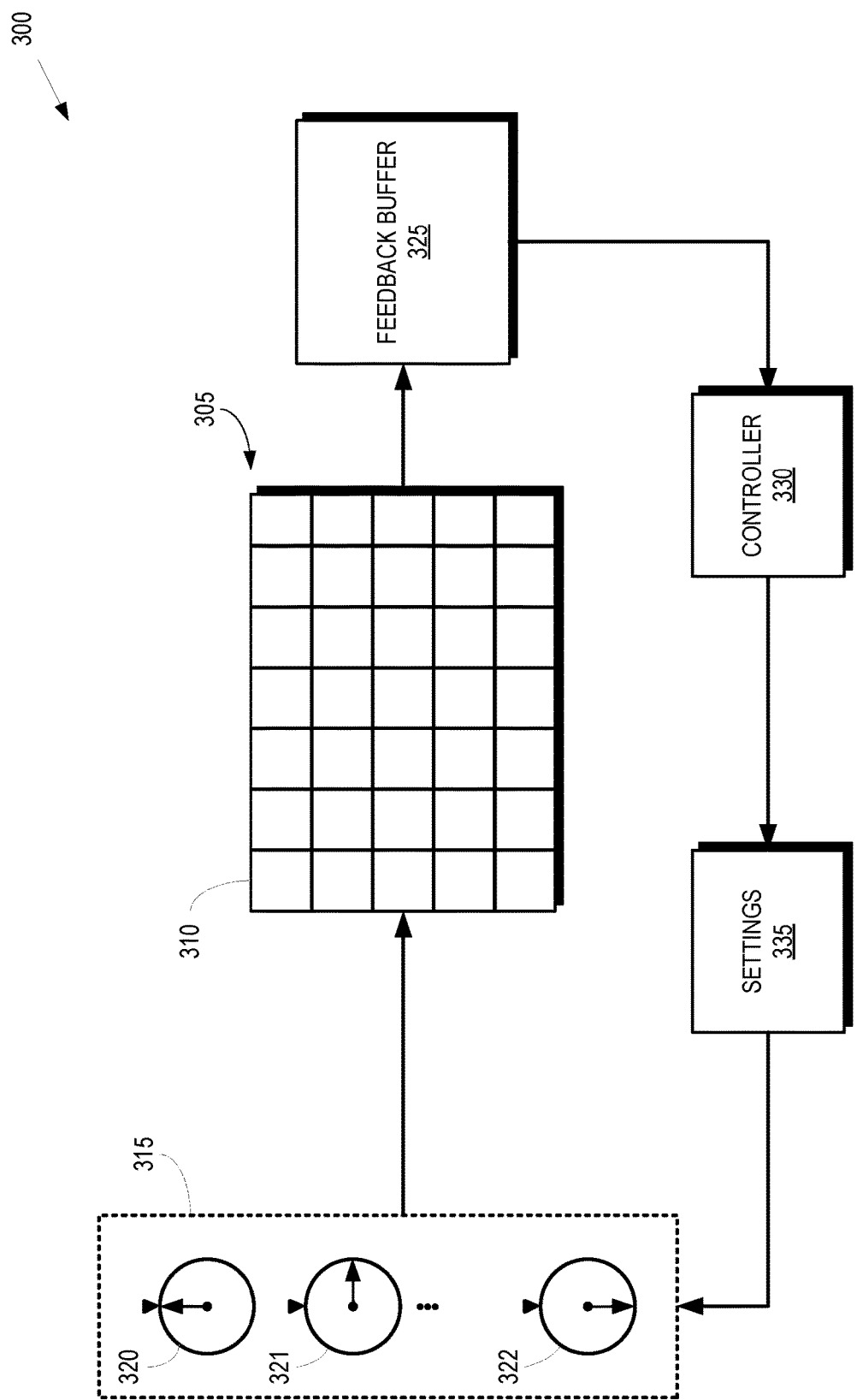
FIG. 3 is a block diagram of a GPU that implements automatic tuning of knobs that set the hardware configuration of a graphics pipeline implemented by the GPU according to some embodiments.

FIG. 3 is a block diagram of a GPU 300 that implements automatic tuning of knobs that set the hardware configuration of a graphics pipeline implemented by the GPU 300 according to some embodiments. The GPU 300 is used to implement some embodiments of the GPU 105 shown in FIG. 1. The GPU 300 includes a GPU core 305 that includes compute units 310 (only one indicated by a reference numeral in the interest of clarity). The number of compute units 310 in the GPU core 305 is a matter of design choice and can range from tens of compute units 310 to thousands of compute units 310 or more. The compute units 310 are used to implement a graphics pipeline such as the graphics pipeline 200 shown in FIG. 2.

Hardware settings for the graphics pipeline are determined based on a set 315 of knobs 320, 321, 322, which are collectively referred to herein as "the knobs 320-322." In some embodiments, the knobs 320-322 represent registers that store values that indicate the corresponding settings. For example, the knobs 320-322 can represent subsets of state that are tuned for performance while other subsets of the state are set to values that enable functionality that is prescribed by an application. In some cases, programs are compiled for execution on the graphics pipeline using different flavors of the same state or program so that a selection is made between the sets of correct but differently tuned settings or programs.

Settings of the knobs 320-322 are, in different embodiments, binary (e.g., on and off), multivalued (e.g., integer values in the range 1-10), continuous within a predetermined range, and the like, or a combination thereof. The values of the settings of the knobs 320-322 are provided to the GPU core 305 to configure the compute units 310 to optimize the performance of the graphics pipeline. Some embodiments of the set 315 include knobs 320-322 that are set to on or off to indicate whether a primitive batch binner is enabled for the graphics pipeline, as well as states or knobs 320-322 that are set to define a rasterizer state, a blend state, a depth stencil state, a primitive topology type of the submitted geometry, and the shaders (e.g., vertex shader, domain shader, geometry shader, hull shader, pixel shader, and the like) that are used to render the scene. Some embodiments of the set 315 also include knobs 320-322 such as knobs to turn a "punch out" on or off crossed with turning binning on or off, late vertex shader allocation, wave throttling, wave launch ordering on the compute units 310, select from an existing set of precompiled shaders, geometry processing modes, performing tessellation and geometry shading on or off chip, and the like.

Optimal settings of the knobs 320-322 are determined by comparing the performance of the graphics pipeline for a sequence of frames using different values of the settings of the knobs 320-322. In some embodiments, one or more settings of the knobs 320-322 is dithered or toggled between different values over a predetermined time interval such as a frame or a set of frames. For example, the setting of a knob 320 that determines whether a primitive batch binner is enabled (the on setting of the knob 320) or disabled (the off setting of the knob 320) is toggled between the on state and the off state in a sequence of successive frames over a predetermined number of frames such as 6-8 frames. End-of-pipe timestamps are written out from the graphics pipeline to a feedback buffer 325. The end-of-pipe timestamps are associated with an identifier of the knob 320. An end-of-frame marker is also written to the feedback buffer 325.

A controller 330 analyzes the time stamps for the frames that are processed using the dithered or toggled values of the knobs 320-322 following data gathering during the predetermined time interval. The controller 330 compares the values of the end-of-pipe timestamps for the different settings of the knobs 320-322 at the end of the predetermined time interval, which corresponds to a predetermined number of frames. The controller 330 also acquires a hash of state information for the graphics pipeline, such as a hash of a byte code of a shader. The settings of the knobs 320-322 that result in a higher level of performance are then associated or correlated with the hash of the state information. For example, first settings of the knobs 320-322 are associated with the hash of the state information if the time required to complete rendering of the first frame (or sequence of first frames) using first settings of the knobs 320-322 is (at least on average) less than the time required to complete rendering of a second frame (or sequence of second frames) using second settings of the knobs 320-322.

The settings of the knobs 320-322 that are generated during the predetermined testing time interval are stored in a settings database 335, which is implemented using a memory. Values of the knobs 320-322 and the corresponding state information stored in the settings database 335 is used to dynamically update or modify the configuration of the knobs 320-322, which results in a reconfiguration of the graphics pipeline according to the updated or modified values of the knobs 320-322. For example, if the knob 320 enables/disables a primitive batch binner, and if improved performance occurs when the primitive batch binner is turned on for applications executing on a graphics pipeline that includes a pixel shader, e.g., as indicated in the settings database 335, the value of the knob 320 is set to "on" to enable the primitive batch binner for applications that execute on the pixel shader, as indicated by a hash of the pixel shader. The testing process disclosed herein can be repeated periodically, in response to an event, or at other times. In some embodiments, multiple different settings of the knobs 320-322 are identified as optimizing the hardware in different states of the graphics pipeline in the GPU 300. The knob settings are dynamically updated in response to the state of the graphics pipeline matching the states associated with the different knob settings, e.g., as indicated by a match between a hash of the current state of the graphics pipeline and a hash of the state of the graphics pipeline associated with one of the knob settings in the settings database 335.

Figure 4:
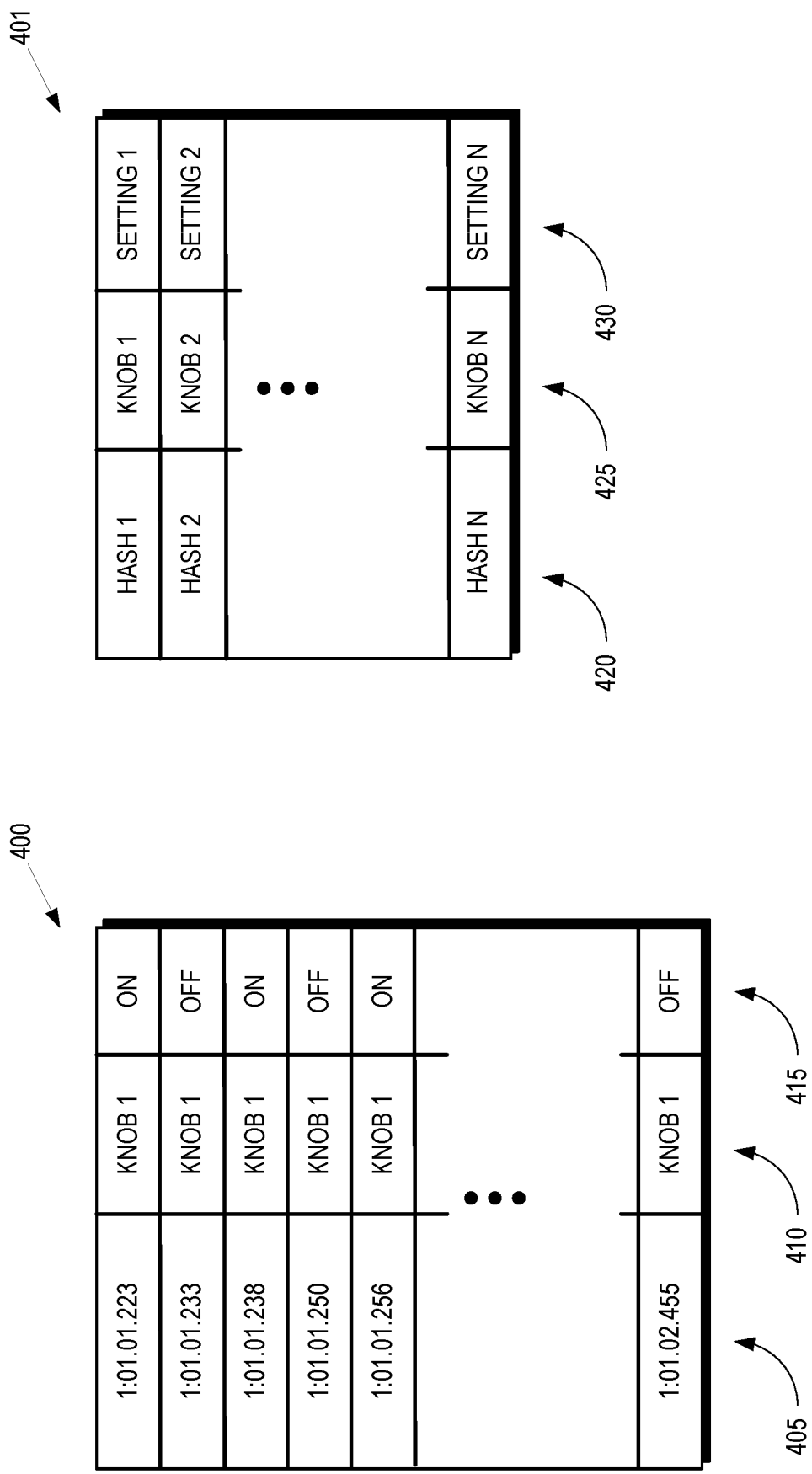
FIG. 4 is a block diagram of a feedback buffer and the settings database according to some embodiments.

FIG. 4 is a block diagram of a feedback buffer 400 and the settings database 401 according to some embodiments. The feedback buffer 400 is used to implement some embodiments of the feedback buffer 325 shown in FIG. 3. The settings database 401 is used to implement some embodiments of the settings database 335 shown in FIG. 3.

The feedback buffer 400 includes rows representing entries that are each associated with execution of an application in a graphics pipeline during one or more frames. The feedback buffer 400 also includes a timestamp column 405 that stores values of end-of-pipe timestamps that are generated by the graphics pipeline in response to completing execution during the one or more frames. The column 410 includes information identifying a knob (or knobs) that are being optimized during the predetermined time interval. In the illustrated embodiment, the knob identifier is KNOB 1, although more than one knob can be optimized in the predetermined time interval. The column 415 includes information indicating a setting for the knob during the corresponding frame or frames. In the illustrated embodiment, the setting of KNOB 1 is dithered or toggled between an on state and off state in successive frames or sets of frames.

The settings database 401 includes rows representing entries that associate knob settings with information representing a state of the graphics pipeline. The knob settings correspond to optimal settings that are determined by dithering or toggling the knob settings in successive time intervals, as discussed herein. The column 420 includes information indicating a hash of a state of the graphics pipeline. The column 425 includes information indicating a knob that is optimized for the corresponding hash of the state of the graphics pipeline. The column 430 includes information indicating the optimal setting of the knob that is to be applied when the graphics pipeline is in the state indicated by the hash. Although the columns 425, 430 shown in FIG. 4 refer to a single knob identifier and corresponding setting, the values in the columns 425, 430 represent combinations of knobs and corresponding settings in some embodiments.

Figure 5:
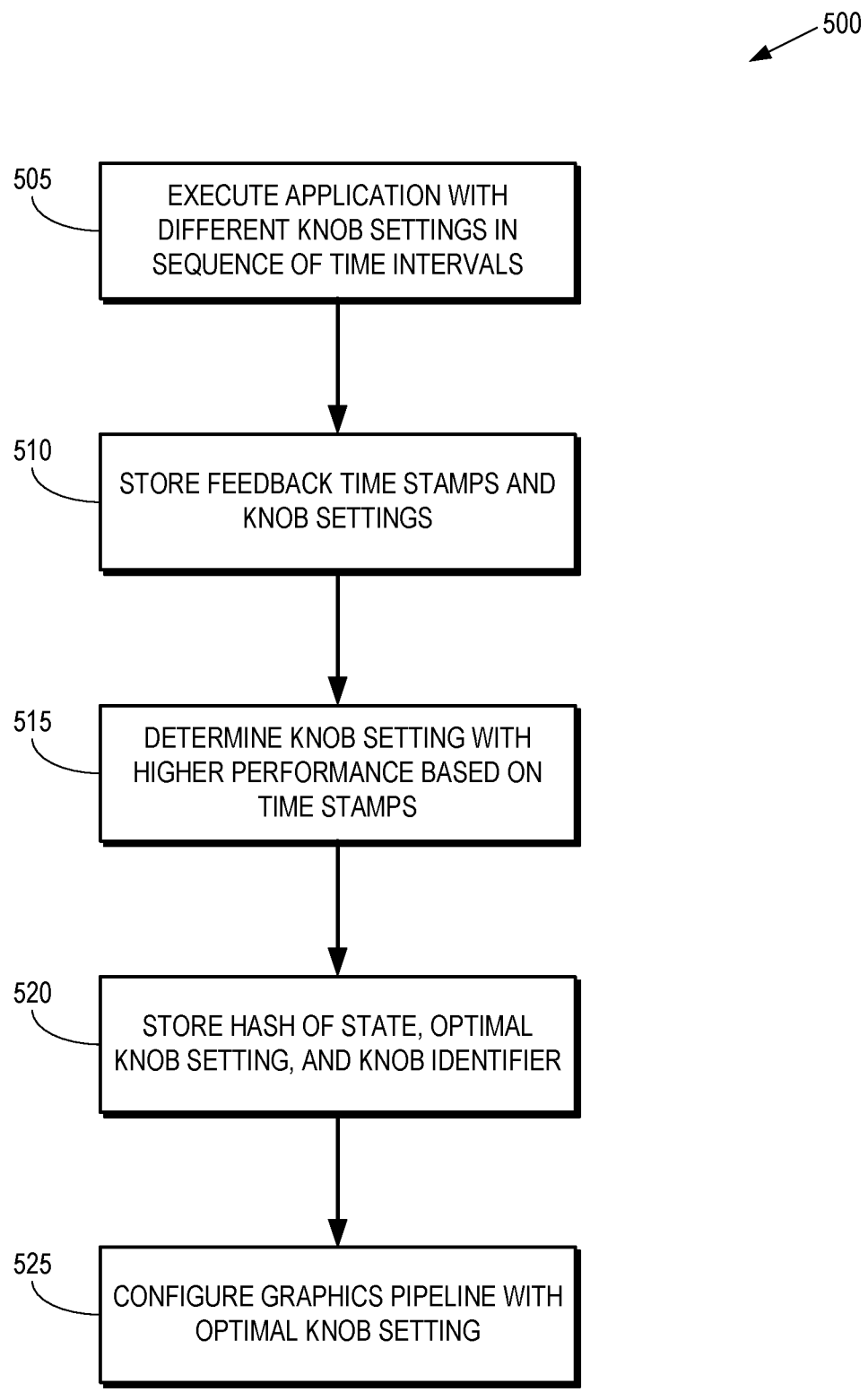
FIG. 5 is a flow diagram of a method of correlating optimal knob settings with a state of a graphics pipeline according to some embodiments.

Some embodiments of the settings database 401 are configured as a log that captures timestamps at the end of predetermined time interval such as the end of each frame. The timestamp is therefore associated with changes in the frame as a whole. Additional timestamps are captured in response to an instance of a knob (or set of knobs) starting or stopping a draw call or dispatch for its work. For example, if there are many knobs being tuned concurrently or at the same time, the number of timestamps is reduced or minimized. An example of a log that is stored in the settings database is:
Time Stamp
FrameBreak
Time Stamp
Knob 1 begin
Knob 2 begin
Time Stamp
Knob 1 end
Time Stamp
Knob 2 end
Time Stamp
FrameBreak FIG. 5 is a flow diagram of a method 500 of correlating optimal knob settings with a state of a graphics pipeline according to some embodiments. The method 500 is implemented in some embodiments of the GPU 105 shown in FIG. 1, the graphics pipeline 200 shown in FIG. 2, and the GPU 300 shown in FIG. 3.

At block 505, the graphics pipeline executes an application with different knob settings in a sequence of time intervals. In some embodiments, the graphics pipeline executes the application while dithering or toggling the knob settings in successive time intervals (such as a frame or a group of frames) over a predetermined time interval such as a predetermined number of frames.

At block 510, end-of-pipe timestamps are stored each time the knob settings are changed in a successive time interval. For example, the timestamps are stored in a feedback buffer in response to the knob settings that are used to configure the graphics pipeline changing because of the dithering or toggling. The process illustrated in blocks 505, 510 continues until the predetermined time interval is complete.

At block 515, a controller determines a knob setting that provides higher performance than the other knob settings based on the timestamps stored in the feedback buffer. Some embodiments of the controller can average the elapsed time required to complete execution of the application in the successive time intervals. The average is performed separately over the time intervals associated with each of the knob settings. The knob setting that provides the lowest average elapsed time is the knob setting that provides the highest performance.

At block 520, information identifying the state of the graphics pipeline during the predetermined time interval (such as a hash of the state) and the optimal knob settings are stored. In some embodiments, the optimal knob setting is stored in a settings database such as the settings database 335 shown in FIG. 3 and the settings database 401 shown in FIG. 4. Knob identifiers and a hash of the state information of the graphics pipeline during the predetermined time interval are also stored in the settings database.

At block 525, the graphics pipeline is configured with the optimal knob setting. The configuration is performed dynamically by modifying the knob settings based on the optimal knob settings stored in the settings database in response to the current state of the graphics pipeline matching the state that is stored in the settings database and associated with the optimal knob settings.

Figure 6:
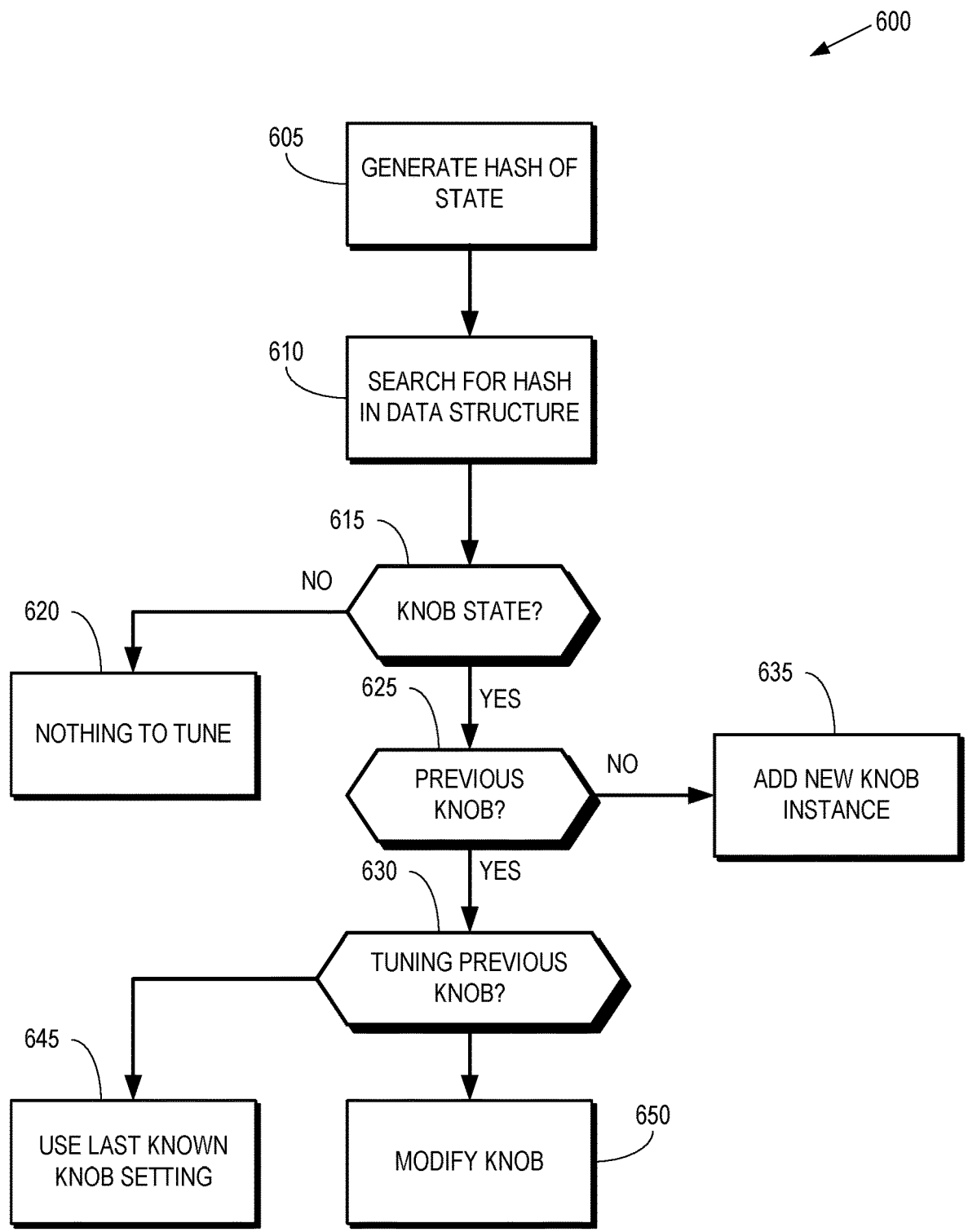
FIG. 6 is a flow diagram of a method of dynamically configuring a graphics pipeline based on a hash of a state of the graphics pipeline according to some embodiments.

FIG. 6 is a flow diagram of a method 600 of dynamically configuring a graphics pipeline based on a hash of a state of the graphics pipeline according to some embodiments. The method 600 is implemented in some embodiments of the GPU 105 shown in FIG. 1, the graphics pipeline 200 shown in FIG. 2, and the GPU 300 shown in FIG. 3. In the illustrated embodiment, the method 600 represents operations that are performed during a frame that is being processed in the graphics pipeline. However, other embodiments of the method 600 are implemented during other time intervals. The method 600 is initiated in response to creation of a new state or binding of a state to the graphics pipeline.

At block 605, a controller generates a hash representing a current state of the graphics pipeline. The hash can represent the entire state of the graphics pipeline or a portion of the state of the graphics pipeline, such as a hash of a byte code of a shader implemented in the graphics pipeline.

At block 610, the controller searches for the hash in an appropriate data structure such as a hash table or array. For example, the controller compares the hash of the current state of the pipeline to a stored hash that represents a previous state of the pipeline. The stored hash is associated with one or more optimal knob settings. For example, the hash of the current state can be compared to the hash of the stored state using information in a settings database such as the settings database 335 shown in FIG. 3 and the settings database 401 shown in FIG. 4.

At block 615, the controller compares the current state of the graphics pipeline (or a portion thereof) with the state (or portions thereof) that is associated with the knobs in the graphics pipeline. For example, a primitive batch binner is enabled when the graphics pipeline is drawing 3D geometry with a non-null vertex and a pixel shader that does not have rasterizer ordered views (ROVs) that are bound in the pixel shader. This portion of the state is therefore used as the activating state for the knob that turns the primitive batch binner on or off. If the current state of the graphics pipeline does not match the activating state for any of the knobs, the method 600 flows to block 620 and the method 600 ends because there are no knobs to be tuned in the current frame. If the current state of the graphics pipeline matches the activating state of one or more of the knobs, the method 600 flows to decision block 625.

At decision block 625, portions of the state that uniquely indicate different instances of a knob, which is referred to herein as "uniquifying" state, is compared to a uniquifying state associated with one or knobs that are currently being tuned by the controller, e.g., in previous frames. In some embodiments, the uniquifying state for each instance of a knob is a subset of the activating state for the instance of the knob. The uniquifying state differentiates one instance of a tuned knob setting from another instance of a knob that can be tuned to a different optimal setting. For example, multiple pixel shaders can execute on the graphics pipeline and the uniquifying state can be the byte code of the currently executing pixel shader. Once the activating state matches, different instances of the primitive batch binner knob are tracked for each unique pixel shader. A hash of the byte code of the pixel shader is used as the uniquifying state for the different knobs. Variances in vertex shaders, drawn geometry, and other state are not considered part of the activating or uniquifying state to reduce the number of knob instances that need to be measured and tuned.

If a previous knob is identified using the uniquifying state at decision block 625, the method 600 flows to decision block 630. If no previous knobs are identified using the uniquifying state, the method 600 flows to block 635 and a new instance of the knob is added for consideration for tuning.

At decision block 630, the controller determines whether the previous knob that was identified based on the uniquifying state is currently being tuned. If not, the method 600 flows to block 645 and the last known setting for the knob is used to configure the knob for the current frame. If the previous knob is being tuned in the current frame, the method 600 flows to block 650 and the value of the knob is modified for the current frame. For example, the value of the knobs can be toggled between an ON setting and an OFF setting.

Figure 7:
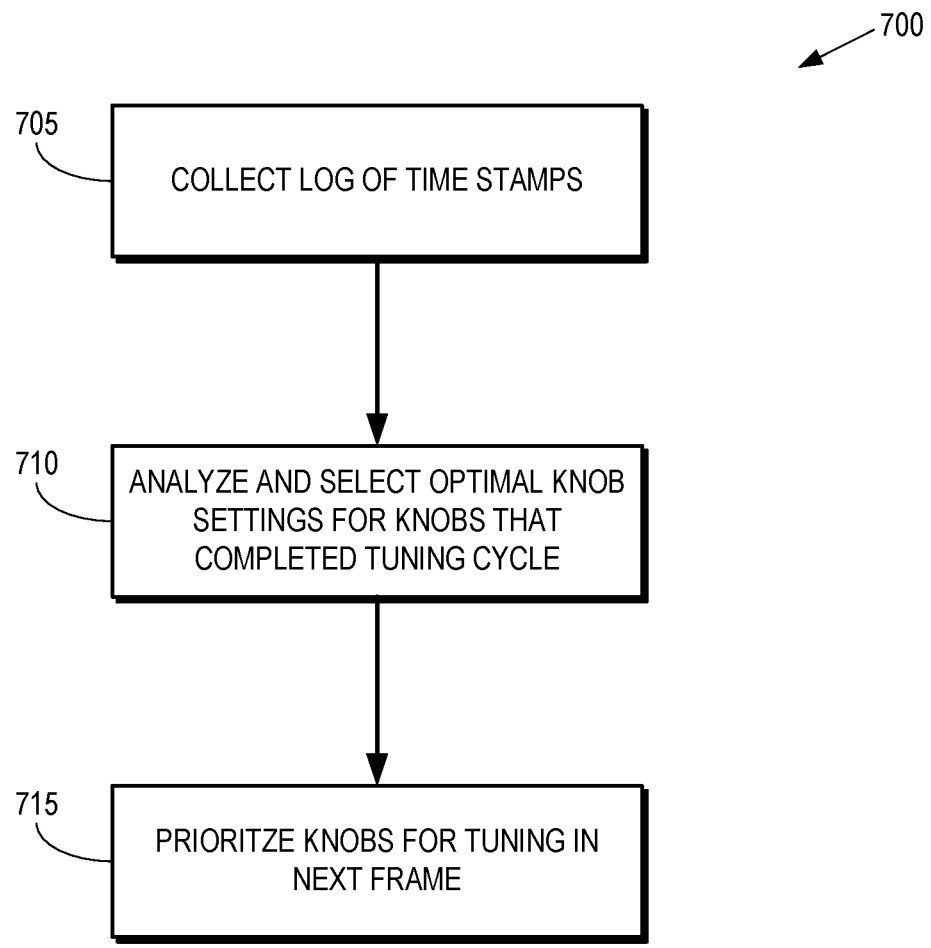
FIG. 7 is a flow diagram of a method of optimizing knob settings for a graphics pipeline according to some embodiments.

FIG. 7 is a flow diagram of a method 700 of optimizing knob settings for a graphics pipeline according to some embodiments. The method 700 is implemented in some embodiments of the GPU 105 shown in FIG. 1, the graphics pipeline 200 shown in FIG. 2, and the GPU 300 shown in FIG. 3. In the illustrated embodiment, the method 700 represents operations that are performed during a frame that is being processed in the graphics pipeline. However, other embodiments of the method 700 are implemented during other time intervals. Some embodiments of the method 700 are executed in response to completion of processing of a frame by the graphics pipeline.

At block 705, a controller collects a log (or other data structure) including timestamps associated with a workload that is executing in the graphics pipeline during the current frame. Some embodiments of the log are implemented using the feedback buffer 400. At block 710, the controller analyzes the information retrieved from the log and selects optimal knob settings for any knobs that have completed their tuning cycle during the current frame. The optimal knob settings are used to configure the graphics pipeline in the subsequent frame. At block 715, the controller prioritizes instances of knobs for tuning in the subsequent frame. In some embodiments, the controller prioritizes or selects the knobs for tuning or retuning based on heuristics that indicate weighted priorities of the knobs, e.g., the knobs that are most likely to influence performance of the graphics pipeline. The method 600 is then repeated in the subsequent frame.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   measuring performance of a graphics pipeline when the graphics pipeline is configured according to a plurality of settings of a knob, wherein the graphics pipeline has a first state while the performance is measured;
   determining that the graphics pipeline achieves better performance when configured according to a first setting of the plurality of settings than when configured according to a second setting of the plurality of settings;
   in response to determining that the graphics pipeline achieves better performance when configured according to the first setting, associating the first setting with information indicating the first state of the graphics pipeline;
   configuring the graphics pipeline according to the first setting in response to the first state of the graphics pipeline matching a current state of the graphics pipeline;
   processing graphics in the graphics pipeline according to the first setting; and
   wherein measuring the performance of the graphics pipeline comprises:
      dithering or toggling the knob between the plurality of settings once per frame for a predetermined number of frames;
      storing end-of-pipe timestamps associated with the plurality of settings for the predetermined number of frames; and
      wherein associating the first setting with information indicating the first state of the graphics pipeline is performed in response to the end-of-pipe timestamps indicating that the first setting achieves better performance than other ones of the plurality of settings during the predetermined number of frames.

2. The method of claim 1, further comprising:
   repeating the predetermined number of frames to associate the plurality of settings of the knob with a plurality of second states of the graphics pipeline periodically or in response to an event.

3. The method of claim 1, wherein the first state of the graphics pipeline is indicated by a hash of first state information for the graphics pipeline, and wherein the first setting is associated with the hash of the first state information.

4. The method of claim 3, wherein configuring the graphics pipeline according to the first setting comprises configuring the graphics pipeline according to the first setting in response to a hash of the current state of the graphics pipeline being equal to the hash of the first state information associated with the first setting.

5. The method of claim 4, wherein the information indicating the first state of the graphics pipeline is a hash of a byte code of a shader in the graphics pipeline.

6. The method of claim 5, wherein the plurality of settings of the knob comprise the first setting indicating that a primitive batch binner is turned on and a second setting indicating that the primitive batch binner is turned off.

7. The method of claim 6, wherein configuring the graphics pipeline according to the first setting comprises configuring the graphics pipeline to turn on the primitive batch binner in response to a hash of a byte code of a current pixel shader matching the hash of the byte code of the shader associated with the first setting or configuring the graphics pipeline to turn off the primitive batch binner in response to the hash of the byte code of the current pixel shader not matching the hash of the byte code of the shader associated with the first setting.

8. The method of claim 1, further comprising:
   associating the plurality of settings of the knob with a plurality of second states of the graphics pipeline; and
   updating knob settings in response to the current state of the graphics pipeline matching different ones of the plurality of second states of the graphics pipeline.

9. An apparatus comprising:
   a plurality of compute units configured to implement a graphics pipeline;
   a memory configured to store information indicating a first setting of a plurality of settings of a knob that configures the graphics pipeline, wherein the first setting is associated with a first state of the graphics pipeline, and wherein the first setting is associated with the first state based on a measure of performance of the graphics pipeline having a first state while configured according to the first setting, based on a measure of performance of the graphics pipeline having the first state while configured according to a second setting of the plurality of settings, and based on a determination that the graphics pipeline achieves better performance when configured according to the first setting;

a controller configured to dither or toggle the knob between the plurality of settings once per frame for a predetermined number of frames and to configure the graphics pipeline according to the first setting in response to the first state of the graphics pipeline matching a current state of the graphics pipeline; and a feedback buffer configured to receive end-of-pipe timestamps associated with the plurality of settings for the predetermined number of frames.

10. The apparatus of claim 9, wherein the controller is configured to associate the first setting with the first state of the graphics pipeline in response to the end-of-pipe timestamps indicating that the first setting achieves better performance than other ones of the plurality of settings during the predetermined number of frames.

11. The apparatus of claim 10 wherein the controller repeats the predetermined number of frames to associate the plurality of settings of the knob with states of the graphics pipeline periodically or in response to an event.

12. The apparatus of claim 9, wherein the first state of the pipeline is indicated by a hash of first state information for the graphics pipeline, and wherein the controller is configured to associate the first setting with the hash of the first state information.

13. The apparatus of claim 12, wherein the controller is configured to configure the graphics pipeline according to the first setting in response to a hash of a current state of the graphics pipeline being equal to the hash of the first state information associated with the first setting.

14. The apparatus of claim 13, wherein the state of the graphics pipeline is indicated by a hash of a byte code of a shader in the graphics pipeline, and wherein the plurality of settings of the knob comprise the first setting indicating that a primitive batch binner is turned on and a second setting indicating that the primitive batch binner is turned off.

15. The apparatus of claim 9, wherein the controller is configured to:

associate the plurality of settings of the knob with a plurality of states of the graphics pipeline; and update knob settings in response to the current state of the graphics pipeline matching different ones of the plurality of states of the graphics pipeline.

16. A method comprising:

dithering or toggling a knob between a plurality of settings over a predetermined time interval, wherein the plurality of settings represent different configurations of a graphics pipeline;

generating a plurality of performance measures for the plurality of settings concurrently with processing graphics in the graphics pipeline during the predetermined time interval; and storing information associating a first setting of the plurality of settings with a first state of the graphics pipeline, wherein the plurality of performance measures indicate that the first setting achieves better performance than other ones of the plurality of settings during the predetermined time interval.

17. The method of claim 16, further comprising:

configuring the graphics pipeline according to the first setting in response to the state of the graphics pipeline matching a current state of the graphics pipeline; and processing graphics in the graphics pipeline according to the first setting.

18. The method of claim 16, wherein the plurality of performance measures include an amount of time taken to complete rendering of a first frame.

* * * * *